United States Patent [19]
Bartholic

[11] Patent Number: 4,944,845
[45] Date of Patent: Jul. 31, 1990

[54] APPARATUS FOR UPGRADING LIQUID HYDROCARBONS

[76] Inventor: David B. Bartholic, 75 Wetumpka La., Watchung, N.J. 07060

[21] Appl. No.: 365,118

[22] Filed: Jul. 3, 1989

Related U.S. Application Data

[62] Division of Ser. No. 116,886, Nov. 5, 1987, Pat. No. 4,859,315.

[51] Int. Cl.$^5$ .......................... B01J 8/18; C10G 7/00; C10G 9/28
[52] U.S. Cl. ........................................ 202/84; 196/46; 196/120; 196/128; 196/132; 196/136; 202/99; 202/208; 422/111; 422/140; 422/145; 422/147
[58] Field of Search ................. 196/46, 120, 126, 127, 196/128, 135, 136, 132; 422/140, 142, 144, 145, 147, 111; 202/84, 99, 208

[56] References Cited

U.S. PATENT DOCUMENTS

| | | | |
|---|---|---|---|
| 2,571,342 | 10/1951 | Crowley | 196/120 |
| 2,666,734 | 1/1954 | Findlay | 196/120 |
| 4,385,985 | 5/1983 | Gross et al. | 422/142 |
| 4,797,262 | 1/1989 | Dewitz | 422/142 |

Primary Examiner—Joye L. Woodard
Attorney, Agent, or Firm—Finnegan, Henderson, Farabow, Garrett & Dunner

[57] ABSTRACT

Apparatus for the treatment of a liquid hydrocarbon charge containing solids or solids-forming contaminants, e.g., inorganic solids, metals and asphaltenes, which includes a contactor vessel having a liquid charge inlet, a vaporizing media inlet above the charge inlet and a vapor-solids outlet. An atomizer is positioned in the charge inlet for forming small particles of the liquid charge and directing the particles of liquid in a substantially horizontal flat pattern into the contactor vessel. A premix downcomer having a dispersion grid positioned therein is located in the vaporizing media inlet for introducing a fluidized mixture of a gas dispersion media and hot circulating solid particles into the contactor vessel in a substantially vertical flat pattern to traverse the path of the liquid particles and intimately contact the liquid particles. The vapor-solids-outlet is positioned in the contactor vessel substantially opposite the liquid charge inlet to receive product vapors and entrain solid particles and rapidly pass the same into cyclones connected to the vapor-solids-outlet for separating solid particles from product vapors. A stripper vessel is located beneath the contactor vessel for receiving heavy solid particles and stripping hydrocarbons therefrom.

17 Claims, 2 Drawing Sheets

APPARATUS FOR UPGRADING LIQUID HYDROCARBONS

This is a division of application Ser. No. 116,886, filed Nov. 5, 1987, now U.S. Pat. No. 4,859,315.

This invention relates to a process and apparatus for separating solids or solids-forming contaminants from a liquid to be upgraded. More particularly, it relates to such a process and apparatus for the upgrading of heavy, liquid hydrocarbon charge-stocks, such as petroleum or fractions thereof, and tar sand bitumens by reducing the content of coke precursors, metal compounds, inorganic solids, and the like to facilitate further processing of such charge-stocks.

BACKGROUND OF THE INVENTION

It is well known that many petroleum crudes, and heavy fractions thereof such as atmospheric or vacuum resides (the residue remaining after fractional distillation of crude oil to remove lighter components) contain coke precursors and metal compounds in amounts which adversely affect further down-stream processing and also, affect the quality of heavy fuels produced therefrom. Similarly, it is known that bitumens obtained from tar sands and heavy oil deposits are difficult and expensive to process because of their high content of asphaltenes and difficult to remove fine particles of inorganic solids.

The above-mentioned coke precursors include polyacrylic hydrocarbons, asphaltenes and the like which tend to break down at elevated temperatures to form carbonaceous materials, often referred to as "coke." In subsequent processing coke may form on the interior walls of refining equipment or be deposited on catalyst to reduce its activity level. Hence, a feed-stock with a high coke forming tendency is undesirable. The coke forming tendency of an oil is generally evaluated by the Conradson Carbon method or the Ramsbottom Carbon method. A higher number from such an evaluation indicates a greater tendency for coke deposition on, for example, catalyst when the oil is processed by the fluid catalytic cracking (FCC) process wherein gas oils are cracked to produce gasoline and other lighter products. In the FCC process, coke is burned from the catalyst in a regenerator to restore catalyst activity and the regenerated catalyst is then recycled for the cracking of additional feed-stock.

The above-mentioned heavy oil charge-stocks often contain compounds of undesirable metals, including nickel and vanadium, which when deposited on FCC catalyst may adversely affect the physical properties of the catalyst and also promote the undesirable production of coke, hydrogren and other light hydrocarbon gases in the operation of the FCC process.

Similarly, the bitumen from tar sands contains minute, sometimes colloidal, particles of sand which, because of the difficulty of removal, cause processing problems in down-stream processing. Also heavy oil deposits often contain fine particles of solids, such as diatomite, which cause similar problems. Although there are vast deposits of such hydrocarbons, their development has been retarded because of the high cost of obtaining and processing synthetic crudes (syncrudes) from such deposits and problems caused by the high content of solids and asphaltenes.

The oil refining industry has long been plagued with the problem of maximizing high value transportation fuels (e.g., gasoline, jet, and diesel fuels) while minimizing the lower value fuel oil, especially residual oil, which is usually high in sulfur and metals. These heavy fuel oils, which are the heavy end of the crude oil, often require further upgrading to decrease the sulfur and metal contents.

The original oil refinery was a very simple bach distillation device in which crude oil was heated to separate the lighter more valuable products of naphtha and kerosene. It was discovered that further heating of the oil that was left after distillation of the lighter products of naphtha and kerosene from the crude oil would result in increased yield of lighter products. However, these additional products did not have the same characteristics as the naturally occurring (virgin) material in the crude oil and were considered "wild" and "unstable" and therefore undesirable. This discovery was what is now referred to as thermal cracking which was used for years as a method of decreasing the bottom of the barrel. As time progressed, the thermal cracking technology was relegated to the upgrading of the absolute bottom of the barrel or "vacuum bottoms." The virgin material in the crude which was heavier than kerosene or diesel but lighter than vacuum bottoms is now predominantly upgraded by the fluid catalytic cracking process (FCC).

In order to produce the feed-stocks for the units in the refinery the simple batch distillation system was replaced with continuous distillation which consisted of a crude unit followed by a vacuum unit. Thus, this resulted in two distillation systems, both containing almost the same equipment of a charge heater, exchangers, and a distillation column. Both systems were required because the heavy atmospheric tower bottoms would thermally crack if a vacuum was not applied to the system to permit the separation to take place at a lower temperature. The refining industry is still trying to reduce the vacuum bottoms yield, but is limited by the equipment employed. This limit is imposed by the time-temperature relationship of the feed heaters. Normally one is limited to about 750 degrees F. on the outlet of the heater. Above this temperature thermal cracking will take place in the heater coils because of high temperatures and time. This thermal cracking results in coking of the heater tubes, overloading of the vacuum ejectors, and "unstable" products.

These processing limitations plus the decreasing availability of lighter crudes, are putting pressure on the industry to find acceptable methods to upgrade the vacuum bottoms. There are many technically feasible processes, but the economics are far from optimum. The hydrogen addition processes require high pressures and large volumes of catalyst, which result in high capital investments, high operating costs, and catalyst disposal problems. The carbon rejection processes are basically less capital intensive, but result in degraded products which need to be further treated, and therefore, increase the capital investment. These carbon rejection processes also produce undesirable byproducts such as high sulfur and high metals coke or, if they use a circulating solid, present a large catalyst disposal problem.

Many techniques are known for upgrading such hydrocarbon charge stocks contaminated with the above-described solids and solid-forming contaminants. For example, delayed and fluid coking processes are used. The coking process uses thermal conversion to produce coke and coker gasoline, coker gas oil, etc. The solid coke is usually high in ash and sulfur, and the distillate often must be further treated before it can be used for charging to catalytic cracking or blending. Solvent extraction and deasphalting processes also are used for preparing FCC charge-stocks from resids.

In U.S. Pat. No. 4,263,128, I have disclosed a process for upgrading whole crude and bottoms fractions from distillation of petroleum by high temperature, short time contact with a fluidizable solid of essentially catalytically inert character to deposit high boiling components of the charge stocks on the circulating solid, whereby Conradsen Carbon values, salt content and metal content are reduced. Therein, an inert solid, such as particles of kaolin clay, is supplied to a rising column for the charge in a contactor to vaporize most of the charge. Carbonaceous and metallic deposits formed on the particles of circulating solid are burned, after which the solid particles are recycled to the contactor.

In U.S. Pat. No. 4,435,272, I have disclosed a process for upgrading such charge-stocks by dispersing the charge introduced into a contactor into a descending curtain of heated particles of an added inert-contact material. The charge is vaporized and carbonaceous materials, salt and metals are deposited on the circulating contact material. Deposits on the contact material are then burned off, the heat of combustion is absorbed by the contact material and the heated contact material is recycled to the contactor for vaporizing the charge.

It is also known to spray FCC feed into a riser reactor of a catalytic cracking unit to improve contact between the feed and catalyst.

Such known processes permit increased utilization of the crude (or syncrude) to produce transportation fuels, but they have high capital and operating costs and may crease environmental concerns.

Therefore, a primary object of the present invention is to reduce the capital and operating costs of the typical refinery. It is a further object to minimize the environmental concerns while allowing the typical refiner to increase transportation fuels yield on crude and to eliminate or reduce the heavy fuel oil yield. These objects may be accomplished by using the process and apparatus of the present invention in place of the crude and vacuum units.

The present invention permits minimizing the degree of thermal cracking so that the products can be treated in existing downstream equipment. Further, the present invention makes it possible to eliminate the vacuum bottoms processing problems by removing over 95% of the metals and over 95% of the asphaltenes, and reducing the sulfur and nitrogen in the feedstock by 30 to 80% while at the same time removing any solids in the feedstock. This latter point is especially important in the upgrading of tar sands bitumens. Transportation fuel yields of 90% or more may be achieved, while the yield of heavy fuel oil may be reduced to 4% or less by use of the present invention. The virtual elimination of the catalyst poisons of metals and asphaltenes allows for the upgrading of the heavy oil product from this process in conventional downstream equipment such as fluid catalytic cracking, or gas oil hydrotreaters or hydrocrackers.

Additional objects and advantages of the present invention will be set forth in part in the following description and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects and in accordance with the purpose of the present invention, there is provided a novel continuous fluidized process for upgrading a heavy liquid hydrocarbon charge-stock or feed containing solid or solid-forming contaminants, which process comprises atomizing the feed to provide a stream of liquid particles (including the contaminants), the liquid particles being of a pre-selected size. The atomized feed is introduced substantially horizontally into a contacting zone and a stream of hot fluidized vaporizing media containing heated solid particles solely derived from the contaminants in the feed is introduced substantially vertically into the contacting zone to intimately contact the atomized feed therein. The temperature of the fluidized vaporizing media and the contact time with the atomized feed therein are sufficient to vaporize hydrocarbons in the feed. No substantial cracking occurs in the contacting zone. Carbonaceous material and other solids are deposited on the heated solid particles or form new solid particles. A substantial portion of the hydrocarbons are vaporized and a mixture is formed of the solid particles entrained in the resulting vaporized hydrocarbons. The mixture is rapidly passed into a separation zone and solid particles separated from the vaporized hydrocarbons therein. Separated solid particles are heated to raise the temperature of the solid particles to a temperature higher than the temperature at which the vaporization occurs. The heated solid particles are recycled to the contacting zone to transfer heat to the atomized feed, and the separated hydrocarbon vapors are condensed and a hydrocarbon product having a substantially reduced content of contaminants is recovered.

Typically, the hydrocarbon feed contains asphaltenes that form carbonaceous materials which under the conditions in the contacting zone either are deposited on solid particles or form solid particles, or both, in the contacting zone. The carbonaceous materials associated with the separated solid particles are burned in a combustor, and the resulting heat of combustion heats the solid particles recycled to the contacting zone to provide heat for the hydrocarbon vaporization. Further, the separated solid particles can be heated with hot solid particles from the combustor, and volatile hydrocarbons stripped therefrom prior to burning the carbonaceous materials.

Advantageously, all of the carbonaceous material formed in the contacting zone is burned in the combustor, and further, the total heat required to vaporize the hydrocarbons in the contacting zone is supplied by the recycled hot solid particles.

It is preferred that the temperature in the contacting zone and the contact time of the hot solid particles and the vaporized feed are controlled to maintain the conversion of 900° F. minus material in the charge-stock at not greater than 10%.

It is further preferred that such contact time is not greater than 5 seconds, the temperature in the contacting step is greater than the mean average boiling point of the liquid feed and less than 1100° F. and the pressure in the contacting step is between about 10 and 50 psia.

In the practice of the preferred process, atomized charge-stock is introduced into the contacting zone through at least one charge or feed injector to provide a generally flat, horizontal pattern of atomized feed therein and the fluidized vaporizing media is introduced downwardly into the contacting zone in a falling curtain, or generally flat vertical pattern, to traverse said feed pattern at an angle of approximately 90°. The mixture of solid particles entrained in vaporized hydrocarbons is then passed substantially horizontally to the inlet of a separation zone which is positioned substantially opposite the point of introduction of the atomized feed.

The present invention also provides novel apparatus for the treatment of a hydrocarbon liquid feed containing solids or solids-forming contaminants comprising a contactor vessel having at least one liquid charge or feed inlet, at least one vaporizing media inlet and at least one vapor-solids outlet, wherein atomizing means are positioned in the charge inlet for forming small particles of the liquid feed having a preselected size and directing the particles of liquid in a substantially horizontal flat pattern into the contactor. Vaporizing media introduction means are positioned in the vaporizing media inlet for introducing a fluidized mixture of a gas dispersion media and hot circulating solid particles into the contactor in a substantially vertical flat pattern so as to traverse the path of said liquid particles and intimately contact the liquid particles. Separator means are connected to the vapor-solids outlet for separating solid particles entrained in vapors formed in the contactor, and the vapor-solids outlet is positioned in the contactor substantially opposite the liquid feed inlet to receive the vapors and entrained solid particles and pass the same into the separator means, so that there is a very short contact time between the vapors and solid particles.

The separating means typically includes one or more primary cyclones and, preferably, one or more secondary cyclones for separating vapors and entrained particles, as is well known in the art.

The apparatus further includes a stripper vessel in flow communication with the contactor vessel for receiving solid particles from the contactor and stripping hydrocarbons from the solid particles therefrom.

Further, there is included a combustor vessel in flow communication with the stripper vessel for receiving stripped solid particles therefrom and burning carbonaceous material from the stripped solid particles, together with particle recycle means for recycling heated solid particles from the combustor to the contactor.

DESCRIPTION OF PREFERRED EMBODIMENTS

Reference will now be made in detail to the present preferred embodiment of the invention, an example of which is illustrated in the accompanying drawings.

Figure 1:
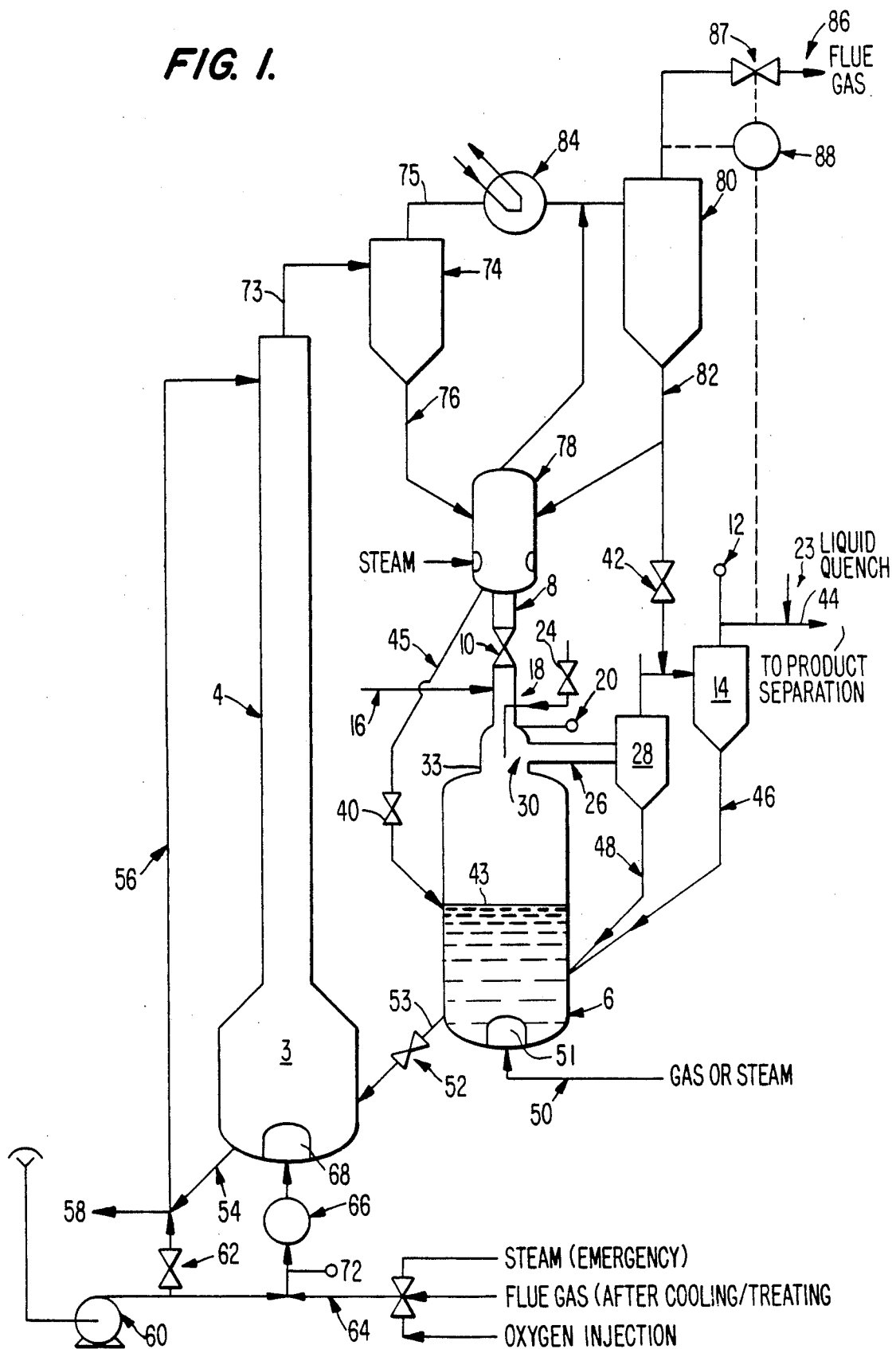
FIG. 1 is a schematic diagram illustrating a preferred system for the practice of the present invention.

A system for practicing the invention is illustrated in FIG. 1. The two major vessels are a combustor 4 and a stripper-heater 6. A hot vaporizing media, which is described below, flows down a vertical standpipe 8 through a slide valve 10 into a pre-mix downcomer 18. Slide valve 10 controls the flow rate of vaporizing media to maintain the desired temperature on a temperature controller 12 positioned in the outlet of a high efficiency cyclone 14. Downstream of slide valve 10, the hot vaporizing media is mixed with a dispersion media, such as steam or recycle gas, from conduit 16 connected to a product distillation and recovery section (not shown) and together with the dispersion media enters the premix downcomer 18 on flow control. When the temperature in the outlet of cyclone 14 varies from a set temperature, temperature controller 12 causes a signal to be sent to an operator on valve 10 which adjusts the opening therein to increase or decrease the flow rate of the vaporizing media, as required. The dispersion media from conduit 16 serves two purposes in that it distributes and propels the vaporizing media downward and acts to reduce the hydrocarbon partial pressure of the system.

The vaporizing media is comprised of hot particles of finely divided solids which are formed from the solid and solid-forming contaminants, such as asphaltenes, sand and the like in the charge-stock. Such particles are formed when the hydrocarbons in the charge stock are vaporized, leaving agglomerated particles of carbonaceous material (or coke), metals or sand, or a combination thereof, either as newly-formed particles or deposited on similar existing particles circulated in the system. The size of such particles will, typically, be in the range of 1 to 120 microns such that they can be fluidized in the system.

Temperature override 20 is a unique feature of the control system. This comprises a temperature sensing element and a flow measurement device positioned in the premix downcomer 18 and connected to a computer 21 (FIG. 2) which is also connected to an operator on feed valve 24. Th flow rate of the charge stock in conduit 22 is determined by use of a flow measurement device 25. The computer will compute, from the flow rate and temperature of the vaporizing media and the flow rate of charge-stock in conduit 22, whether there is enough heat available to vaporize the feed. If there is not, the computer 21 will reset the flow rate of charge-stock to the system to a lower rate. Upon loss of the vaporizing media, the computer will shut off the feed valve 24. This is one of the features of this process system which will eliminate the possibility of coking of the system, which would result in a shutdown. Downstream of temperature override 20, the charge-stock is atomized and injected horizontally into a contactor 26 in intimate contact with the dispersion media and vaporizing media.

It is important that the charge-stock be atomized into the contactor 26 to insure intimate contact of the charge and fluidized particles so that the majority of the particles, along with the dispersion media and the vaporized charge, are entrained through the horizontal contactor 26 into the separator means which includes first and second stage cyclones 28 and 14. This can be accomplished many ways, but will be described by reference to a preferred design of a horizontal contactor 26 and an atomizing means 32.

The horizontal contactor 26 comprises a substantially horizontal conduit connecting a "top-hat" portion 33 (i.e., the upper portion of stripper-heater 6 having a lesser diameter) of stripper-heater 6 to the inlet of first-stage cyclone 28, which is positioned opposite an atomizing means 32. The top hat 33 and horizontal contactor 26 provide a contacting zone 27 wherein the atomized charge is in intimate contact with the heated vaporizing media. It is necessary that the atomized charge be introduced essentially horizontally into the top hat so as to pass through a falling curtain of solid particles into contactor 26. This allows for design of the system with multiple contactors 26 and even multiple charge injectors spaced around the particle inlet 30 into the contactor 26. The charge injection point is essentially at or slightly higher than the center of the horizontal contactor 26 particles inlet 30 into the top hat portion 33 of stripper-heater 6. The top hat 33 is employed in this design to decrease the time in this section and will result in a downward velocity of greater than 10 fps, and more preferably, greater than 20 fps. The vaporized charge plus the dispersion media and majority of the solid vaporizing media will immediately exit contactor particle inlet 30 of the stripper-heater vessel 6 through horizontal contactor 26. Horizontal contactor 26 will accelerate the velocity of the solids and vapors up to 50 to 100 fps, depending on the cyclones employed. The time in this contactor will typically be less than 0.1 second as the length of this contactor only has to be sufficient to mechanically install cyclone 28. The heavier solid vaporizing media and the unvaporized charge material will essentially be propelled into the top of stripper-heater 6 and heavier solid vaporizing media will settle by gravity as fluidizable particles. These new particles will mix with the other particles entering the stripper-heater 6.

Figure 2:
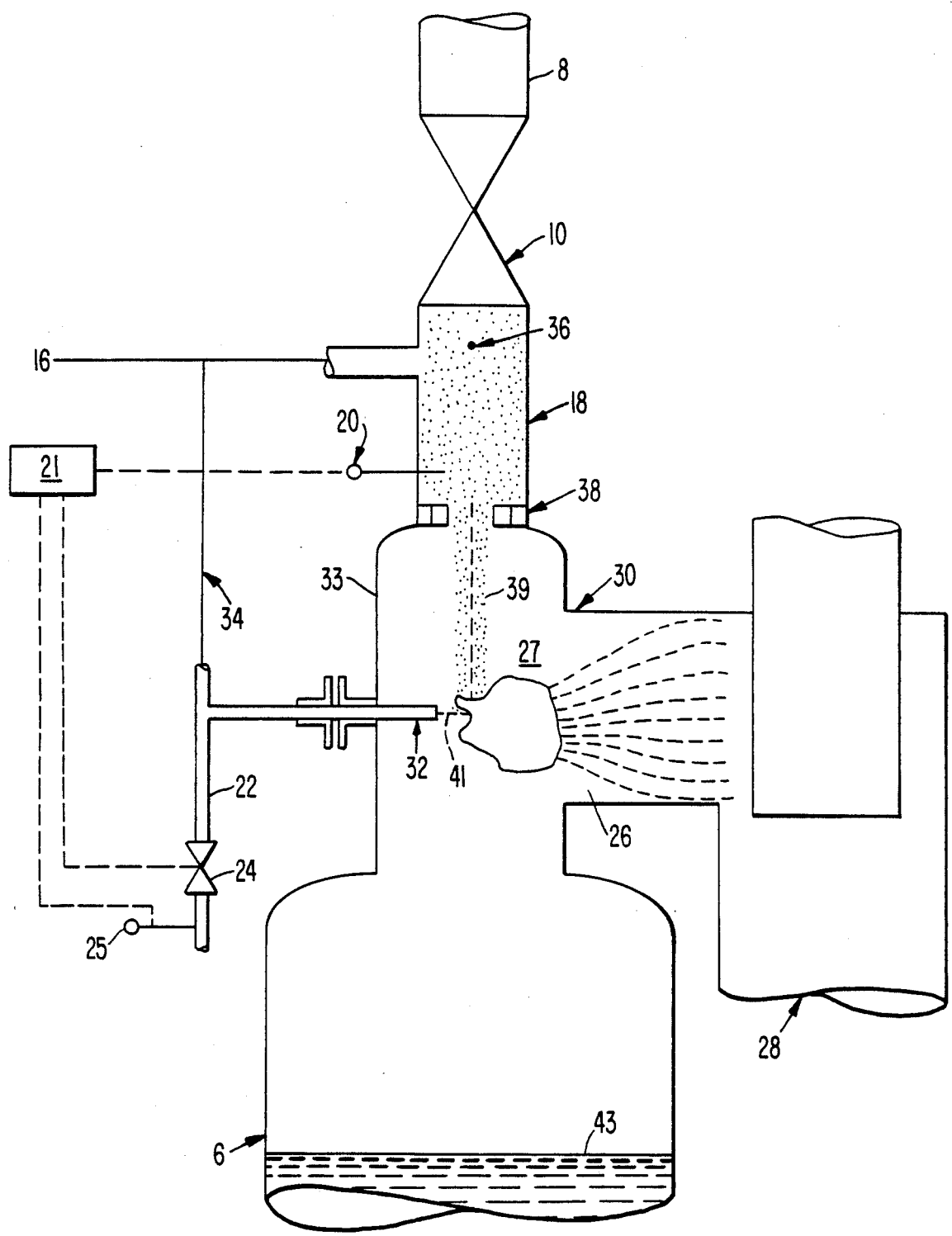
FIG. 2 is an enlarged partial view of the system of FIG. 1 showing in greater detail the operation of the horizontal contactor used in the practice of the present invention.

As stated previously, the proper design of the charge atomization means to form fluidizable particles and the design of the feed-hot circulating solids contacting is critical. A larger view of this system is shown in FIG. 2. For purposes of description, the charge stock will be a tar sands bitumen with 10 weight percent solids. To simplify the description, only one feed injector and one horizontal contactor will be described, but this should be in no way limiting, as those skilled in the art will know how to add more contactors 26 and charge injectors 32 for increased charging rates.

The type of charge atomizer 32 will depend to a great extent on the solids content of the charge-stock. However, the intent is to atomize the charge into droplets of particle size in the range of 1 to 100 microns, or heavier if so desired from a fluidization point of view, to yield a circulating inventory of 40 to 90 micron average particle size. Droplets in the 1 to 10 micron average particle size range are preferred. As stated previously, the charge stock can be atomized with water, steam, or gas. The preferred atomizing media is gas and preferably the same gas as used as the dispersion media. The pressure drop across the charge stock atomizer 32 will vary from 0.5 to 30 psi depending on the solids content of the feed and the desired droplet size and atomizing media. The higher the solids content the lower the pressure drop to reduce erosion.

The preferred atomizing means includes an injector having a nozzle for producinhg a flat horizontal pattern, a conduit for connection to a source of gaseous atomizing media supplied under pressure to the injector and a conduit for supplying charge stock to the injector.

With the above in mind, the description of using a tar sands bitumen feed with 10 weight percent solids will continue. There is no limit, except economical, on the concentration of solids in the charge that the process can handle. All that is ncessary is to design the system so as to recover and remove the solids, e.g., sand and metals, for disposal. As shown in FIG. 2, the charge is combined with gaseous atomizing media from conduit 34, which is connected to dispersion media conduit 16, in feed injector 32, which is removable/adjustable burner assembly similar to the one typically used for injecting torch oil into a FCC regenerator. The tip of the nozzle on feed injector 32 is a horizontal slot, which will give a horizontal flat fan-shaped pattern covering an angle approximately equal to the width of the below-described falling curtain of hot fluidizing solid minus about 10 to 20 degrees, so as to be certain to only contact hot fluidizing media.

The hot fluidized vaporizing media is a combination of the preferred gas dispersion media and hot circulating solid particles 36 from control valve 10. Downstream of the mixing point of these two materials in a premix downcomer 18, dispersion grid 38 in the vaporizing media inlet at the top of the "top hat" portion 33 of stripper-heater 6 channels the total vaporizing media into a flat vertical pattern 39, which will traverse the flat horizontal pattern 41 of the atomized charge at approximately 90 degrees. Thus, there is provided a means for introducing the hot vaporizing media into the contacting zone which includes the premix downcomer 18 and dispersion grid 38. The dispersion media will actually act to propel the hot fluidizing solid 36 through dispersion grid 38 with a resultant velocity of less than 40 fps in top hat 33, as discussed previously. The result of mixing these streams in the contacting zone 27 will be like an explosion as the feed increases in volume because of vaporization and cracking reaction. This explosion will result in an acceleration of solid particles mainly through particle inlet 30 into the horizontal contactor 26, as this is the only way for the vapors to escape. However, some of the non-vaporized charge, which will mainly be asphaltene molecules under going cracking, will form new particles, deposit on the hot circulating fluidizable solid, or deposit on the solids in the feed. The heavier particles that are not entrained into the horizontal contactor 26 will settle out onto the top of the particulate bed 43 in stripper-heater 6. FIG. 2 depicts by dotted lines the assumed path of the feed and vaporizing media through the contactor into the inlet to the separator means. If there is more than one feed point and/or more than one contactor, the dispersion grid 38 can be designed to distribute the vaporizing media in another pattern to insure intimate contact of feed and vaporizing media.

It is important to note that if the molar rate of dispersion media is the same as the molar rate of the charge vapors after vaporization and reaction, then the resultant velocity of the two in top hat 33 will be twice the velocity of only the dispersion media. In this case, it would be less than 80 fps or the same as the inlet velocity of cyclone 28. Therefore, one can obtain lower contactor times in this type of apparatus compared to those systems known in the art and using similar equipment. In a 50,000 bpd system, the top hat 33 and horizontal contactor 26 would be about 45 inches in diameter. The stripper-heater 6 diameter would be about 8 feet. If it is assumed that the cyclone 28 inlet can be placed right outside the stripper heater 6 vessel wall, then the total length of the contactor 26 from the center of top hat 33 is the radius of stripper-heater 6, or 4 feet. At 80 fps the contactor time would be 0.05 seconds. This is ultra-short compared to what is known in the art. Times this short are impossible in the verticle, folded, or downflow riser contactors/reactors previously discussed in the art.

The contact time can be increased significantly by increasing the dispersion media flow (top hat velocity increase) and injecting the feed downwardly into the stripper-heater 6 with the vaporizing media surrounding the feed injector. Of course, the length of horizontal contactor 26 can be increased to increase the contact time.

Compared to either an upflow or downflow vertical riser, the present system has the distinct advantage of a feed injection system that eliminates the possibility of coking problems in the system. A confined riser is plagued with coking problems because of poor feed and vaporizing media distribution, which results from erratic media circulation, insufficient media circulation to vaporize the feed, rapid feed rate changes, or plugged feed injectors, which results in liquid feed contacting the confining walls of the riser or feed injector sides and forming coke. Once the coke forms it continues to grow until the refiner is forced to shutdown the unit. The horizontal contactor is employed in the present invention not only to minimize the contact time relative to that in a vertical riser, but also to eliminate the coking problems. If override control 20 does not function, the system will continue to operate, since the feed injected into the top hat 33 of stripper-heater 6 will flow downwardly countercurrent to the vapors from the bed, which will vaporize the lighter material in the feed. The remaining unvaporized hydrocarbon, which will be the majority of the heavy carbonaceous material in the feed, will be dispersed on top of the particulate level (bed) 43 in stripper-heater 6, which will be hot enough to vaporize the feed, since slide valve 40 will open to control the level in dipleg surge pot 78, and add the same amount of vaporizing media to the bed level in stripper-heater 6 as was added to the upper section before losing the vaporizing media flow. In effect, the operation in this mode will result in a operation approaching a fluid coking process with the products being highly degraded.

The temperature of the charge-stock in conduit 22 is typically above 400° F., and more preferably above 500° F., the charge-stock can be dispersed/atomized with steam, gas, water or by viscosity/differential pressure control across the feed injector 32. The vaporizing media along with the dispersion media contacts the feed and vaporizes the 1000° F. minus and thermally stable molecules boiling above 1000° F. in the hydrocarbon feed with little or no conversion in the ultra-short contact time contactor 26. The heavy, thermally unstable molecules boiling above 1000° F. convert to lighter hydrocarbons, and the high molecular weight/high boiling asphaltene molecules form carbonaceous particles or deposits on the particles of vaporizing media and decompose into a low hydrogen solid carbonaceous material and a lighter hydrocarbon product. The hydrocarbon vapors, along with the entrained solid particles, exit horizontal contactor 26 and enter primary contactor cyclones 28 where 90% of the entrained solids are separated from the vapors. The hydrocarbon vapors exit cyclone 28 and are reheated at least 5° F. by the addition of hot combustor product through slide valve 42 in dip leg 82 connected to secondary cyclone 80. This addition, or reheating, of the vapors eliminates coking in the high efficiency secondary contactor cyclones 14, where the remaining solids of greater than 10 microns are separated from the vapors.

The vapors exit secondary cyclone 14 through vapor recovery line 44 and are immediately quenched by introducing a suitable quenching media through line 23 before product separation in distillation equipment (not shown), as is well known in the art. The solids separated in contactor cyclones 28 and 14 enter stripper-heater 6 below the normal particulate level 43 in order to seal the diplegs 46 and 48. These particles along with the ones which separate from the dispersion media and charge in the stripper-heater top hat 33 are mixed with hot material from the combustor 4 which enters near the top of the normal particulate level 43 of stripper-heater 6 through slide valve 40 in line 45 connected to dipleg surge pot 78. The purpose of this hot material is two-fold. One is to aid the gas or steam stripping media which enters the bottom of stripper-heater 6 through line 50 distributor 51 in the stripping and vaporizing of any hydrocarbon liquid that remains on the cold particles from the contactor. The other is to raise the temperature of the particles to aid in burning of the carbonaceous material in the combustor 4. Since the combustor 4 is a completely fluidized system, one must be concerned with the time-temperature relationship, or the kinetics of burning. Therefore, this hot material is added to the stripper-heater 6 at a rate to control the carbon burning rate in the combustor. This recycle rate can be as high as three times the vaporizing media rate.

It is realized that in the feed atomization-vaporizing media contacting section 27 of this process that some particles larger than those derived will form from agglomeration of the solids in the feed with asphaltene molecules, by agglomeration with colloidal material in the feed, and larger than desired carbonaceous/metals products. These particles will not enter the horizontal contactor 26 with the vaporized feed and the majority of the particles, but will be propelled downwardly onto level 43 by the vertical force created by the dispersion gas intersecting the atomized feed at less than 40 fps and their own mass. These particles will flow downwardly through stripper-heater 6 and mix with the hot material, the particles separated from the product vapors, and the stripping media. The heated particles exit the stripper-heater 6 on level control through slide valve 52 in line 53 connecting the stripper-heater 6 and the combustor and enter the combustor bottom 3, which is shown as having a larger diameter than the upper portion of combustor 4. This combustor bottom 3 serves two purposes. One is to separate higher density and larger particles by velocity differences (elutriation). These heavier particles and larger particles will settle or stay in the bottom portion 3 wherein the velocity is lower. They will remain here until they form smaller particles by burning off the carbonaceous material or by attrition. In essence, this design sizes the particles for proper fluidization. The smaller particles escape the system through the cyclones while the larger particles formed in the contactor flow by gravity into the combustor bottom 3, where they remain until they are the proper size and density for fluidization out of the combustor bottom into the upper portion of combustor 4. The combustor bottom 3 is instrumentated to indicate the density of the particles at intervals across its height. As the larger, higher density particles increase in the lower combustor bottom 3, they are removed through line 54 into elutriator-burner 56 before being withdrawn through line 58.

The elutriator-burner 56 includes a conduit wherein the particles are mixed with a source of oxygen, such as air, and is designed to take the heavier particles from the lower combustor 3 to further oxidation or treating as required. As shown, the present system can be fluidized with air from blower 60 through flow control valve 62. In this way all the carbon is burned from the particles so that the remaining material which would normally be the metals in the feed, plus any heavy feed particles, can be removed through line 58 to disposal or metals recovery. The size of elutiator-burner 56 will depend on the amount of total ash in the feed. The outlet of elutriator-burner 56 can go to any convenient location in upper combustor 4 and the elutriator-burner system 56 can be operated as a batch system if desired.

The second purpose of the increased diameter lower combustor 3 is to trade time for length of the combustor. The typical design conditions for the combustor would be less than 20 seconds gas time with a preferred time of 10 seconds at temperatures greater than 1400° F. The higher the temperature, the less the time required, so the increased time in the lower combustor may at times be unnecessary. In this case, the upper portion of combustor 4 and lower combustor portion 3 would be the same diameter and the elutriation would take place in another vessel.

Because this embodiment of the present invention employs a completely fluidized combustor, it is critical to maintain the velocity in the combustor within certain ranges. If the velocity is too low the particles will not be fluidized and the system will stop circulating. If the velocity is too high there will not be enough time to burn the carbonaceous material formed in the contactor. Therefore, this system is distinctive in that it recycles flue gas, after cooling, through line 64 and startup air from blower 60 through heater 66 into the bottom 3 of the combustor through the distributor 68 to fluidize the particulates entering through slide valve 52 from the stripper-heater 6. The flue gas can be replaced or is normally supplemented with air from air blower 60 to obtain the necessary oxygen for combustion. The air blower 60 flow rate is controlled by the inventory in the combustor and the total air plus flue gas flow rate is controlled by flow controller 72. The air could be replaced with oxygen if there is an air plant available. The total gas rate to the combustor 4 is controlled to give a velocity of less than 30 fps and normally about 10 fps, but always above the transport velocity of the carbonaceous particles of the desired size. The fluidized particles, along with the combustion products, continue up the upper portion of combustor 4 and pass thru line 73 to primary combustor cyclone 74 where 90%+of the particles are separated from the combustor gases. The separated particles exit cyclone 74 through dipleg 76 to the lower portion of dipleg surge hopper 78, which is used to strip with steam as much of the flue gas as possible from the hot particulates to minimize the flue gas carried over to the horizontal contactor section. The extremely low pore volume of the carbonaceous particles is also very helpful in reducing the amount of entrained gases or vapors circulated between vessels. Both primary cyclone 74 and secondary cyclone 80 diplegs 76 and 82, respectively, discharge below the particulate level in surge hopper 78.

The products of combustion, plus some solids, exit primary cyclone 74 through line 75 and pass through flue gas cooler 84 before entering high efficiency cyclone 80 where all particles greater than 10 microns are removed so that the system gases can go to a power recovery system (not shown) without further separation. Also, if the exit gases (flue gas) in flue gas line 86 are to be treated downstream for $SO_x$ or $NO_x$ control, the amount of particles carried over will be minimal.

The flue gas cooler 84 is another unique feature of this process system. In the preferred arrangement, cyclone 80 is not a conventional cold wall cyclone with minimum metal internals exposed to the high temperatures as is primary cyclone 74, but it is a high efficiency cyclone system made up of multiclones, as in the Euripos third stage cyclone described in U.S. Pat. No. 4,348,215, which may have a temperature limit of less than 1600° F. This in many cases is less than the operating temperature contemplated for the present process. Therefore, cooling of this stream is provided to protect the multiclones. The preferred method of cooling is a heat exchanger, usually used to produce steam to lower the flue gas temperature to the 1400° F.-1600° F. This exchanger could be replaced with a liquid or steam quench, but this would normally cause problems because of dew point in downstream equipment.

The pressure on the combustor system is controlled by differential pressure controller 88, connected to flue gas line 86 and to line 44 which passes the contactor vapors to vapor recovery and product separation. Pressure controller 88 regulates the rate of flue gases exiting the system through line 86 by adjusting valve 87. Controller 88 regulates the pressure differential between the combustor and the contactor in order to stabilize the particulate circulation.

The control system of this process is unique in that all the carbonaceous material formed in the contactor must be burned so that there is no excess for withdrawal and one does not run out of inventory. It is a balance of inventory and oxygen demand. Therefore, all the particulate levels in the combustor 4, including lower combustor portion 3, the stripper-heater 6, and the dipleg surge pot 78 are monitored continually. The particulate level/inventory in the combustor ¾ is the only system not on control and therefore is really the only variable on inventory. As a minimum, the oxygen rate is reset by the change in inventory in the combustor. That is, if the combustor inventory increases, the air flow rate to the combustor is increased to burn more of the carbonaceous particles and decrease the inventory. If the inventory decreases, the opposite happens and the air flow rate through air blower 60, or the oxygen rate, is decreased and the burning decreased. Of course, the exact opposite happens to the recycled flue gas since the total gas rate to the combustor is controlled by flow controller 72. If one needs to minimize the amount of CO in the flue gas line 86, the combustor flue gas temperature should be a minimum of 1400° F.

Depending upon the contaminants in the chargestock, it may be advantageous to initially add finely divided particles of charcoal, clay or the like to the charge fed to the above-described system to initiate the formation of circulating particles, but such additions are stopped once adequate particles are formed. If clay, or another such non combustible solid is used, it is withdrawn from the system through line 58 as described above.

Principal differences between the system of the present invention and fluid coking or the selective vaporization processes are:

The system of the present invention employs a downward vaporizing-dispersion media flow followed by an essentially horizontal feed injection and horizontal contactor. This eliminates coking in the equipment and results in much shorter contact times between the vaporized charge and the hot solid particles than can be accomplished in known systems. Not counting contact time in the cyclone section, which can be as high as 0.5 seconds, this system can provide contact times of from about 0.1 to about 0.2 seconds.

The present system employs a stripper-heater for minimizing hydrocarbon product entrainment into the combustor, and also for increasing the contactor particle temperature to decrease the time necessary for combustion.

The air rate to the combustor is controlled on inventory.

The combustor is a completely fluidized system with flue gas recycle to maintain the desired velocity in the combustor.

The use of a flue gas cooler between the primary and secondary cyclones on the combustor.

The use of a dipleg surge pot as a stripper to reduce gas carryover to the horizontal contactor.

Injecting the hot combustor particles into the stripper-heater at the top of the particulate level therein to increase the temperature of the vapors leaving the particulate bed in the stripper-heater to eliminate coking which might result from contacting cooler stripping vapors with heavy hydrocarbon vapors.

Using the bottom combustor as a lower velocity elutriator.

The process self-generates the particulates from the feedstock but only generates enough for heat balance. Therefore, there it is not necessary to withdraw any coke material from the system.

Having described the principles and a preferred embodiment of the present invention, it should be recognized that modifications and variations thereof falling within the scope of the appended claims will become apparent to one skilled in the art.

What is claimed is:

1. Apparatus for the treatment of a liquid hydrocarbon charge containing solids or solids-forming contaminants comprising:
    (a) a contactor vessel having at least one liquid charge inlet, at least one vaporizing media inlet above said charge inlet and at least one vapor-solids outlet;
    (b) atomizing means positioned in said charge inlet for forming small particles of said liquid charge having a preselected size and directing said particles of liquid substantially horizontally into said contactor vessel;
    (c) vaporizing media introduction means positioned in said vaporizing media inlet for introducing a fluidized mixture of a gas dispersion media and hot circulating solid particles into said contactor vessel substantially vertically so as to traverse the path of said liquid particles and intimately contact said liquid particles; and
    (d) contactor separator means connected to said vapor-solids outlet for separating solid particles entrained in vapors formed in said contactor vessel;
    (e) wherein said vapor-solids outlet is positioned in said contactor vessel substantially opposite said liquid charge inlet to receive said vapors and entrained solid particles and rapidly pass the same into said separator means.

2. The apparatus of claim 1, further including a stripper vessel beneath and in flow communication with said contactor vessel for receiving heavy solid particles from said contactor vessel and stripping hydrocarbons from said solid particles.

3. The apparatus of claim 1, further including a combustor vessel interconnected with said stripper vessel for receiving stripped solid particles therefrom, means for fluidizing solid particles in said combustor vessel and for burning carbonaceous material from said solid particles therein, and first conduit means for passing the burned solid particles to said vaporizing media inlet.

4. The apparatus of claim 3, wherein said combustor vessel has an upper portion and a lower portion and wherein said lower portion has a larger diameter than said upper portion.

5. The apparatus of claim 4, further including withdrawing means connected to said lower portion for withdrawing therefrom solid particles heavier than that which is fluidized in said combustor vessel.

6. The apparatus of claim 5, further including elutriator-burner means connected to said withdrawing means for further burning solid particles withdrawn from said lower portion.

7. The apparatus of claim 3, wherein said contactor separator means comprises primary and secondary separators, the primary separator having a vapor outlet and the secondary separator having an inlet interconnected with said primary separator vapor outlet, and further including means for adding hot burned solid particles from said combustor vessel to vapors passed from said primary separator vapor outlet to the inlet of said secondary separator to raise the temperature of the vapors.

8. The apparatus of claim 7, further including third conduit means for passing separated solids from said contactor separator means into said stripper vessel.

9. The apparatus of claim 3, further including multiple-stage combustor separation means connected to said first conduit means for separating burned solid particles from combustion products produced in said combustor vessel by said burning of carbonaceous material.

10. The apparatus of claim 9, further including second conduit means for passing separated burned solid particles from said multiple-stage combustor separation means into said stripper vessel.

11. The apparatus of claim 9, further including cooling means between the stages of said combustor separation means for cooling the products of combustion passed through said combustor separator means.

12. The apparatus of claim 3, wherein said combustor vessel has an upper portion and a lower portion, and further including (1) combustor separation means connected to said upper portion of said combustor vessel for separating burned solid particles from combustion products produced in said combustor vessel by said burning of carbonaceous materials and (2) means for passing separation combustion products from said combustor separation means to said lower portion of said combustor vessel.

13. The apparatus of claim 12, further including means for introducing an oxygen-containing gas into said lower portion of said combustor vessel.

14. The apparatus of claim 13, further including means for controlling the flow rates of said separated combustion products and said oxygen-containing gas introduced into said lower portion of said combustor vessel.

15. The apparatus of claim 1, further including a temperature sensing element and first flow measuring device in said vaporizing media introduction means, a charge conduit connected to said atomizing means, a second flow measuring device connected to said charge conduit, a valve in said charge conduit and a computer connected to said temperature sensing element and said first and second flow measuring devices for receiving signals therefrom and connected to said valve for sending signals thereto so as to control the flow rate of charge through said charge conduit in response to the signals received.

16. The apparatus of claim 1, wherein said vaporizing media introduction means comprises a premix downcomer having a dispersion grid positioned therein, for channeling the vaporizing media downwardly in a substantially flat vertical pattern.

17. The apparatus of claim 16, wherein said atomizing means is provided with an orifice for forming a substantially flat horizontal pattern of said particles of liquid.

* * * * *